(12) United States Patent
Vauchel et al.

(10) Patent No.: US 8,960,597 B2
(45) Date of Patent: Feb. 24, 2015

(54) PROPULSION UNIT FOR AN AIRCRAFT AND AIR INTAKE STRUCTURE FOR SUCH A UNIT

(75) Inventors: Guy Bernard Vauchel, Harfleur (FR); Chiristophe Thorel, Le Havre (FR)

(73) Assignee: Aircelle, Gonfreville L'Orcher (FR)

( * ) Notice: Subject to any disclaimer, the term of this patent is extended or adjusted under 35 U.S.C. 154(b) by 426 days.

(21) Appl. No.: 12/993,059

(22) PCT Filed: Mar. 4, 2009

(86) PCT No.: PCT/FR2009/000230
§ 371 (c)(1),
(2), (4) Date: Nov. 16, 2010

(87) PCT Pub. No.: WO2009/138580
PCT Pub. Date: Nov. 19, 2009

(65) Prior Publication Data
US 2011/0068222 A1    Mar. 24, 2011

(30) Foreign Application Priority Data
May 16, 2008  (FR) ..................................... 08 02657

(51) Int. Cl.
*B64D 33/02* (2006.01)
*F02C 7/04* (2006.01)
*B64D 29/08* (2006.01)
*F02K 3/06* (2006.01)

(52) U.S. Cl.
CPC . *F02C 7/04* (2013.01); *B64D 29/08* (2013.01); *B64D 33/02* (2013.01); *F02K 3/06* (2013.01); *B64D 2033/0286* (2013.01); *Y02T 50/671* (2013.01)

USPC ....................................................... 244/53 B

(58) Field of Classification Search
CPC .............. F02C 7/04; F02C 7/045; F02C 7/05; B64D 33/02; B64D 33/0206
USPC ........................................ 244/53 B; 60/226.1
See application file for complete search history.

(56) References Cited

U.S. PATENT DOCUMENTS 6,896,099 B2 *  5/2005  Porte et al. ..................... 181/214
6,920,958 B2 *  7/2005  Harrison ......................... 181/214

FOREIGN PATENT DOCUMENTS

| EP | 1357279 | 10/2003 |
|----|---------|---------|
| FR | 0800471 | 7/1936 |
| FR | 2847304 | 5/2004 |
| FR | 2906568 | 4/2008 |

(Continued)

OTHER PUBLICATIONS

International Search Report; PCT/FR2009/000230; Aug. 11, 2009.

*Primary Examiner* — Brian M O'Hara
(74) *Attorney, Agent, or Firm* — Brinks Gilson & Lione

(57) ABSTRACT

This propulsion unit for an aircraft comprises: a fan (3) comprising a fan casing (23) the interior wall of which has a coating (25) the upstream edge of which is set back relative to the upstream edge (29) of the said casing (23), and an air intake assembly (A) comprising an air intake structure (1) comprising an air intake lip (7) and an acoustic shroud (11) extending between this air intake lip (7) and the upstream edge of the said coating (25). The said shroud (11) is connected to the said casing (23) simply by nesting inside this casing (23), this nesting possibly being supplemented by discrete means of connection between these two elements (11, 23).

13 Claims, 8 Drawing Sheets

(56) References Cited

FOREIGN PATENT DOCUMENTS

| GB | 2274490 | 7/1994 |
| GB | 2288578 | 10/1995 |
| WO | 2005090156 | 9/2005 |

* cited by examiner

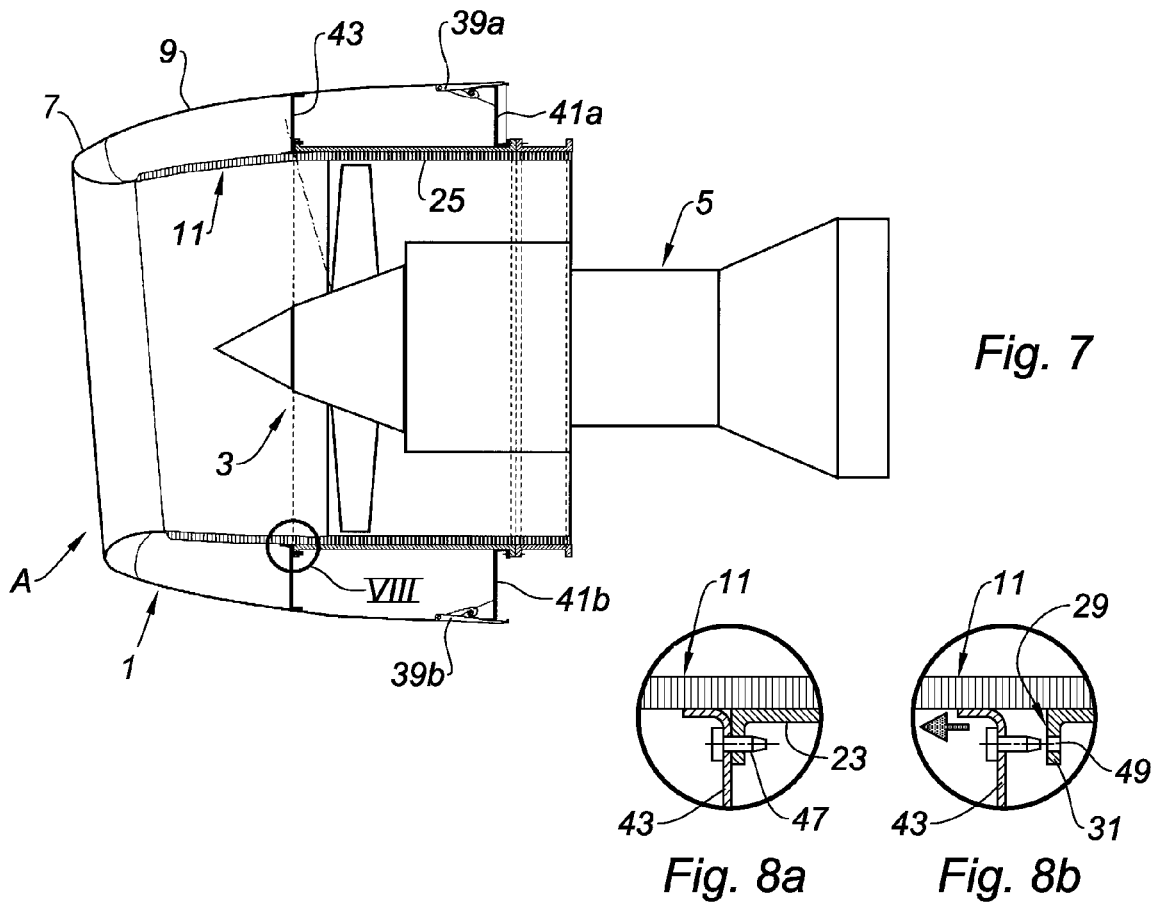
Fig. 7
Fig. 8a  Fig. 8b
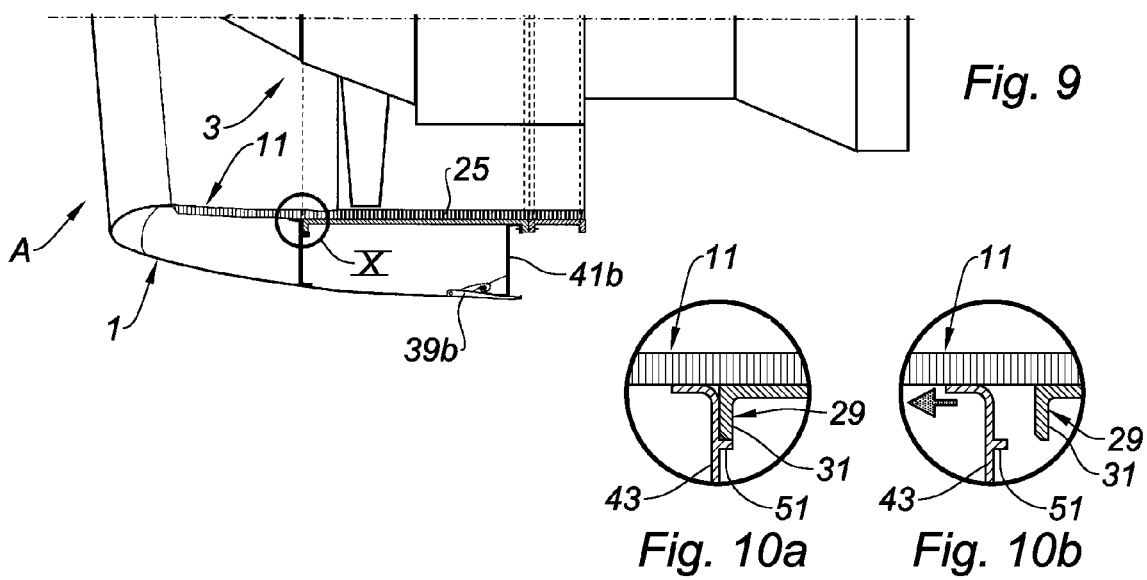
Fig. 9
Fig. 10a  Fig. 10b

PROPULSION UNIT FOR AN AIRCRAFT AND AIR INTAKE STRUCTURE FOR SUCH A UNIT

TECHNICAL FIELD

The present invention relates to a propulsion unit for an aircraft, and an air intake structure for such a unit.

BACKGROUND

Known from the prior art, and in particular from document WO2005/090156, is a propulsion unit for an aircraft, comprising:
  a fan comprising a fan case whereof the inner wall includes a coating whereof the upstream edge is set back in relation to the upstream edge of said case, and
  an air intake assembly comprising an air intake structure comprising an air intake lip and an acoustic shroud extending between said air intake lip and the upstream edge of said coating.

In this propulsion unit of the prior art, and traditionally, the acoustic shroud is made integral with the fan case by an annular flange, such a flange being connected on one hand to the fan case and on the other hand to the acoustic shroud by respective fastening means.

Such an arrangement requires sufficiently significant dimensioning of the acoustic shroud to have the necessary resistance with regard to stresses passing through the areas connecting said shroud with said flange.

BRIEF SUMMARY

The present invention aims in particular to allow a smaller dimensioning of the acoustic shroud of such a propulsion unit, in order to save weight.

This aim of the invention is achieved with a propulsion unit for an aircraft, comprising:
  a fan comprising a fan case whereof the inner wall includes a coating whereof the upstream edge is set back in relation to the upstream edge of said case, and
  an air intake assembly comprising an air intake structure comprising an air intake lip and an acoustic shroud extending between said air intake lip and the upstream edge of said coating.
  remarkable in that said shroud is connected to said case by simple nesting inside this case, this method possibly being supplemented by discrete means of connection between these two elements.

In the context of the present invention, "periodic means" designates fastening members such as screws distributed discretely on the periphery of the acoustic shroud or deformable support beams as taught by patent application FR08/00471 filed by the applicant on Jan. 29, 2008.

Due to the simple nesting connection, possibly completed by periodic connecting means, it is no longer necessary to provide a fastening flange of the acoustic shroud on the fan case, as was the case in the prior art: the elimination of this flange constitutes a first source of weight savings in itself.

A second source of weight savings comes from the fact that the connection by simple nesting makes it possible to reduce the stresses applied to the acoustic shroud in its connecting area with the fan case, this acoustic shroud thus being able to have smaller dimensions, and therefore a reduced weight.

It will also be noted that the connection of the acoustic shroud by simple nesting in the fan case makes it possible to separate these two pieces from each other very simply, both in the case where this acoustic shroud moves with the air intake structure during opening thereof, and in the case where this acoustic shroud remains inside the fan case during opening of the air intake structure.

This easy separation considerably facilitates maintenance operations, in particular when it involves replacing the acoustic shroud following an impact by foreign bodies discharged by particular by the fan blades.

According to other optional features of the assembly according to the invention:
  said acoustic shroud is fastened on said lip, so as to slide as a single piece with said air intake structure when said structure is opened for maintenance;
  said acoustic shroud is in simple edge-to-edge contact on said lip, without being fastened on said lip, so as to remain nested inside said case during opening of said air intake structure for maintenance;
  said fan case extends to said lip;
  said fan case does not extend to said lip;
  said unit comprises means for fastening said air intake structure in relation to said fan;
  said fastening means are inserted between a front partition of said air intake structure and said case;
  said fastening means comprise bolts inserted between an outer panel of said air intake structure and said case;
  said fastening means are inserted between the downstream edge of said lip and said case;
  said fastening means are inserted between the downstream edge of said lip and said acoustic shroud;
  this propulsion unit comprises means for centering said air intake structure in relation to said fan;
  said centering means are connected to said fastening means;
  this propulsion unit comprises means for stiffening said air intake structure;
  said stiffening means comprise stiffeners fixedly connecting said outer panel to said acoustic shroud;
  said means for centering said air intake structure in relation to said fan case is inserted between said stiffeners and the upstream edge of said case;
  this propulsion unit comprises stiffeners fastened on said outer panel and bearing simply on the plates arranged at the outer periphery of said acoustic shroud;
  this propulsion unit comprises means for centering said acoustic shroud in relation to said fan case;
  said means for centering the acoustic shroud comprises centering lugs inserted between the upstream edges of this shroud and said case;
  said coating is at least partially smooth and/or acoustic and/or abradable: an acoustic coating makes it possible to contribute to the absorption of the noise emitted by the fan and the engine; an abradable coating, situated in the portion located directly around the propeller of the fan, allows the blades to have minimal play with the fan case during the rotation by "running in" of the blades.

The present invention also concerns an air intake assembly adapted for a propulsion unit according to the preceding.

BRIEF DESCRIPTION OF THE DRAWINGS

Other features and advantages of the present invention will appear in light of the following description, and upon examining the appended figures, in which.

FIG. 7 shows, in operating position, another alternative of this first embodiment;

FIGS. 8a and 8b are detail views of zone VIII of FIG. 7, in the operating and maintenance positions, respectively;

FIG. 9 is a half-view of still another alternative of the first embodiment of the propulsion unit according to the invention, in the operating position;

FIGS. 10a and 10b are detail views of zone X of FIG. 9, in the operating and maintenance positions, respectively;

DETAILED DESCRIPTION

In the description that follows, we will use the terms "upstream" and "downstream."

Figure 1:
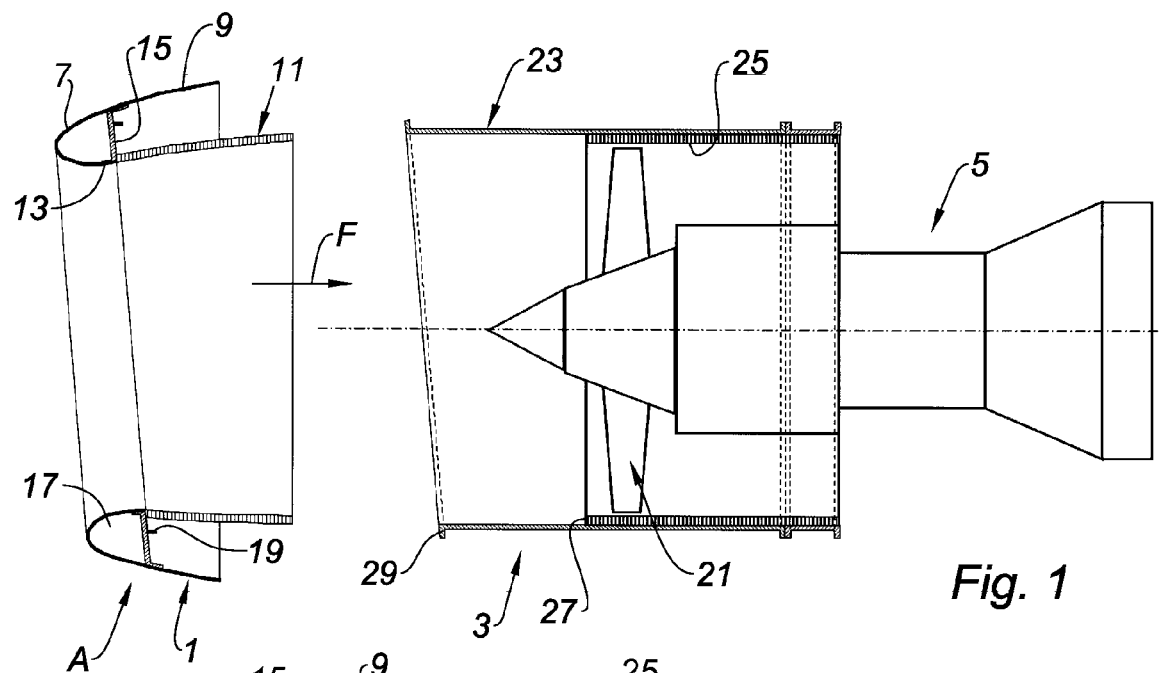
FIGS. 1 and 2 illustrate, diagrammatically and in axial cross-section, a propulsion unit according to a first embodiment of the invention, in maintenance and operating positions, respectively.

These terms must be understood in relation to the direction of air circulation in the propulsion unit according to the invention, as indicated by arrow F in FIG. 1.

In all of the attached figures, identical or similar references designate identical or similar members or units.

FIG. 1 shows that the propulsion unit according to the invention comprises an air intake assembly A including an air intake structure 1 and, downstream from the latter, a fan 3 itself forming the upstream portion of a turbojet engine 5.

The air intake assembly A constitutes the upstream portion of a nacelle whereof the other portions, designed to surround the fan 3 and the turbojet engine 5, are not shown.

This air intake assembly A makes it possible to channel the air from the outside toward the fan 3 and the turbojet engine 5.

The air intake structure 1 comprises an air intake lip 7, peripheral element constituting the leading edge of this air intake structure, as well as an outer panel 9 extending the outer portion of the air intake lip 7.

The air intake assembly A also comprises an acoustic shroud 11 extending the lower portion of the lip 7.

The outer panel 9 and the air intake lip 7 can be formed in a single piece.

The acoustic shroud 11 comprises a panel provided with an acoustic absorption capacity (honeycomb structure, for example), essentially cylindrical in shape.

In a first embodiment shown in FIGS. 1 to 10, this acoustic shroud 11 is fixed to the inner edge of the lip 7, such that when the air intake structure 1 is in the maintenance position, as illustrated in FIG. 1, the intake structure 1 and the shroud 11 move as a single piece.

FIG. 1 shows that a front partition 15, defining an annular cavity 17 inside the lip 7, can be provided.

Such a partition makes it possible on one hand to stiffen the air intake structure 1, and on the other hand to implement de-icing means inside the cavity 17.

Advantageously, this front partition 15 supports centering pins 19.

The fan 3 includes a propeller 21, arranged inside a fan case 23.

A coating 25, the upstream edge 27 of which is set back in relation to the upstream edge 29 of the fan 23, covers the inner wall of said fan.

Such a coating can be smooth, or can have acoustic absorption characteristics (so as to limit the level of the sound emissions from the fan 3), or can also be abradable (so as to allow minimal play of the blades of the fan 21 with the case 23 after the "running in" phase).

Of course, such a coating can be made up of several portions each respectively having some of the aforementioned properties, for example: abradable part in the in the area of the propeller 21, and acoustic part downstream from said propeller.

Figure 2:
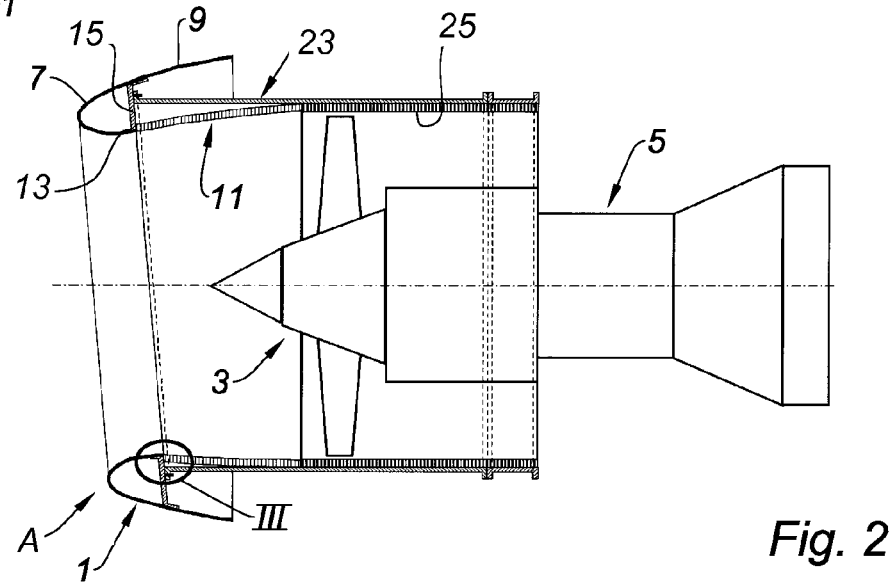

FIG. 2 shows that when the propulsion unit of FIG. 1 is in the operating position, the acoustic shroud 11 is nested inside the fan case and comes edge to edge with the coating 25.

Figure 3:
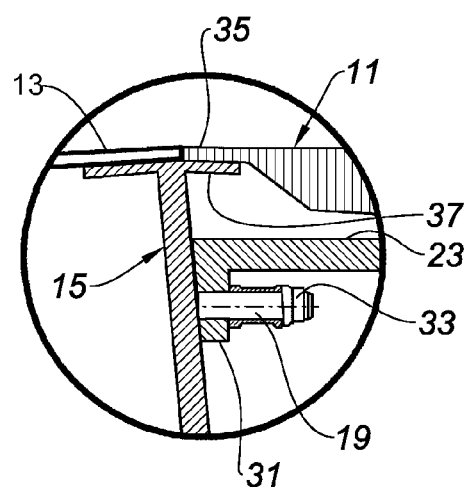
FIG. 3 illustrates a detail view of zone III of FIG. 2.

In this first alternative shown in FIGS. 1 to 3, the length of the fan case 23 is sufficient to reach the front partition 15, which allows the pins 19 of that front partition to cooperate with a lip 31 formed on the upstream edge 29 of the case 23, as shown in FIG. 3.

These pins make it possible to perform an accurate centering of the air intake structure 1 in relation to the fan 3, and possibly to fix this air intake structure solidly on this fan: as shown in FIG. 3, it is possible to place bolts 33 on the pins 19, prohibiting any relative movement of the air intake structure in relation to the fan.

It will be noted that no particular connecting means is provided between the acoustic shroud 11 and the coating 25: the maintenance in place of this acoustic shroud is obtained solely due to the nesting of this shroud in the case 23, and its connection with the air intake structure 1.

The latter connection is visible in FIG. 3: the acoustic shroud 11 includes, at its upstream end, a zone 35 with a smaller thickness and greater compactness, fixed on a return 37 of the front partition 15.

Figure 4:
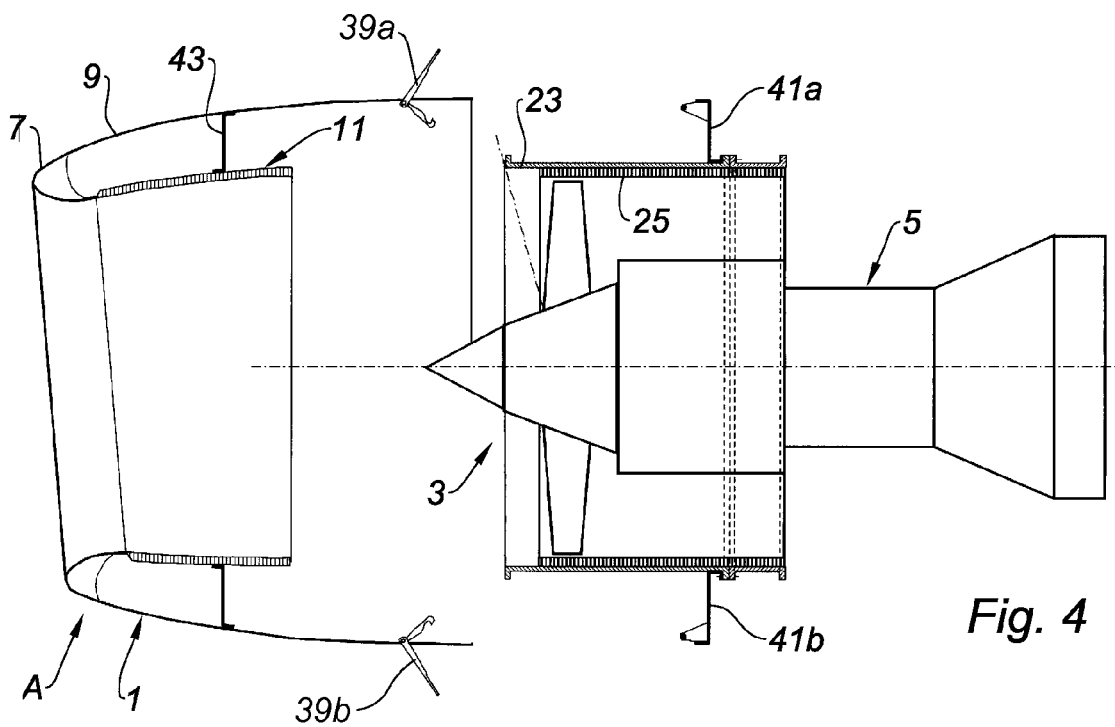
FIGS. 4 and 5 are views similar to FIGS. 1 and 2 of an alternative of the first embodiment of the propulsion unit according to the invention.
Figure 5:
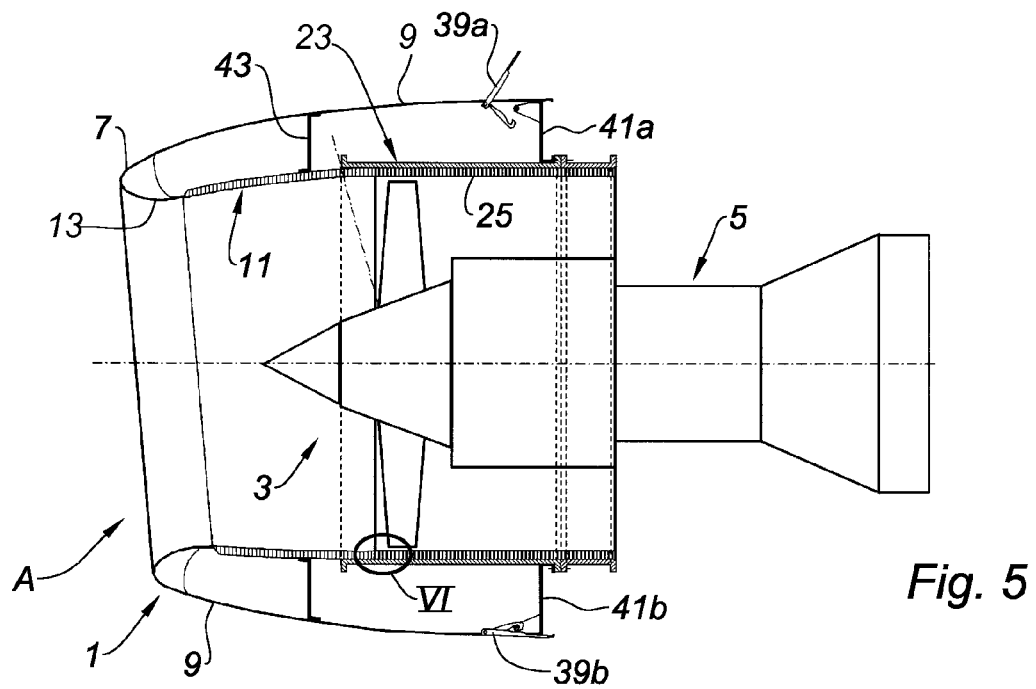
Figure 6:
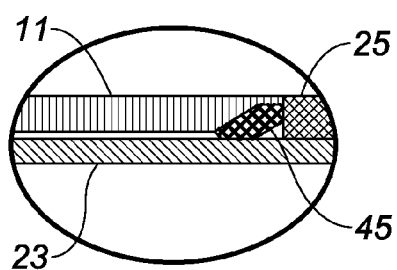
FIG. 6 is a detail view of zone VI of FIG. 5.

In the alternative illustrated in FIGS. 4 to 6, one can see that in the operating position (FIG. 5), the fan case 23 does not extend to the inner edge 13 of the lip 7, but that the outer panel 9 however covers part of that fan case.

In this case, the fastening of the air intake structure 1 on the fan case 3 is done using manual or electric bolts 39a, 39b, cooperating with the respective retaining means 41a, 41b fastened to the outside the fan case 23.

The stiffening of the air intake unit can be obtained using stiffeners extending between the outer panel 9 and the acoustic shroud 11.

In this alternative, as in the preceding one, it is possible to place, inside the case 23, means for centering the acoustic shroud 11 in relation to the coating 25.

Such centering means, which can comprise chamfered discrete or continuous members 45, as shown in FIG. 6, makes it possible to eliminate any radial offset of the acoustic shroud in relation to the coating 25, and thus to ensure aerodynamic continuity.

FIGS. 7 and 8 show that alternatively, the stiffeners 43 can be arranged so as to abut with the upstream edge 29 of the case 23 when the propulsion unit is in the operating position.

In this case, centering pins 47 can be provided on these stiffeners 43, these pins being able to cooperate with complementary orifices 49 formed in the lip 31 of the edge 29 of the case 23.

These centering pins 47 make it possible to optimize the centering of the air intake unit in relation to the fan.

An alternative illustrated in FIGS. 9 and 10 includes, on the stiffeners 43, returns 51 abutting on the radially outer portion of the lip 31 of the edge 29 of the fan case (see FIGS. 10a and 10b).

Figure 11:
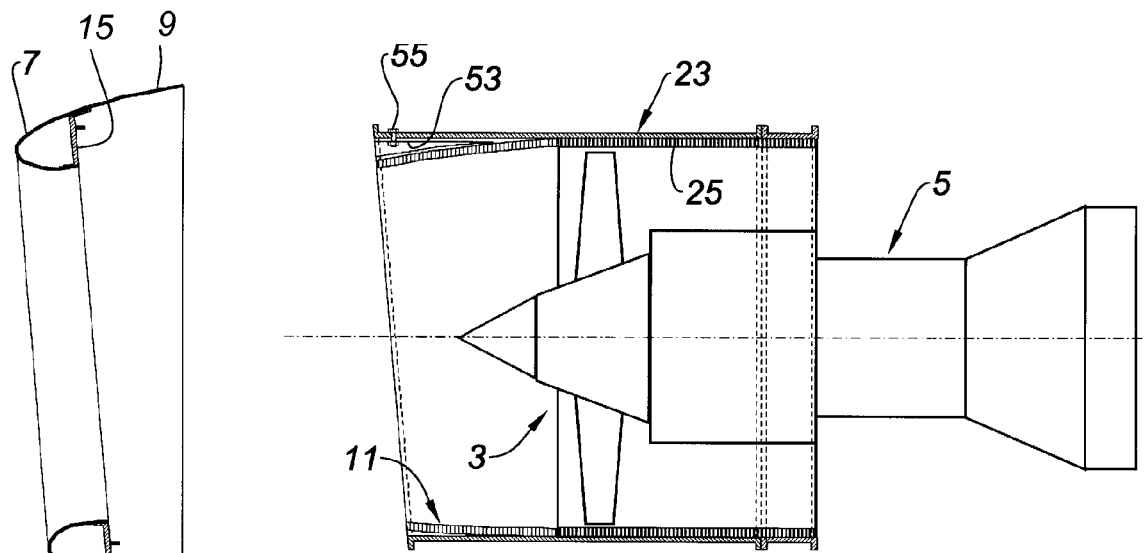
FIGS. 11 to 13 are views similar to FIGS. 1 to 3, respectively, of a second embodiment of the propulsion unit according to the invention.
Figure 12:
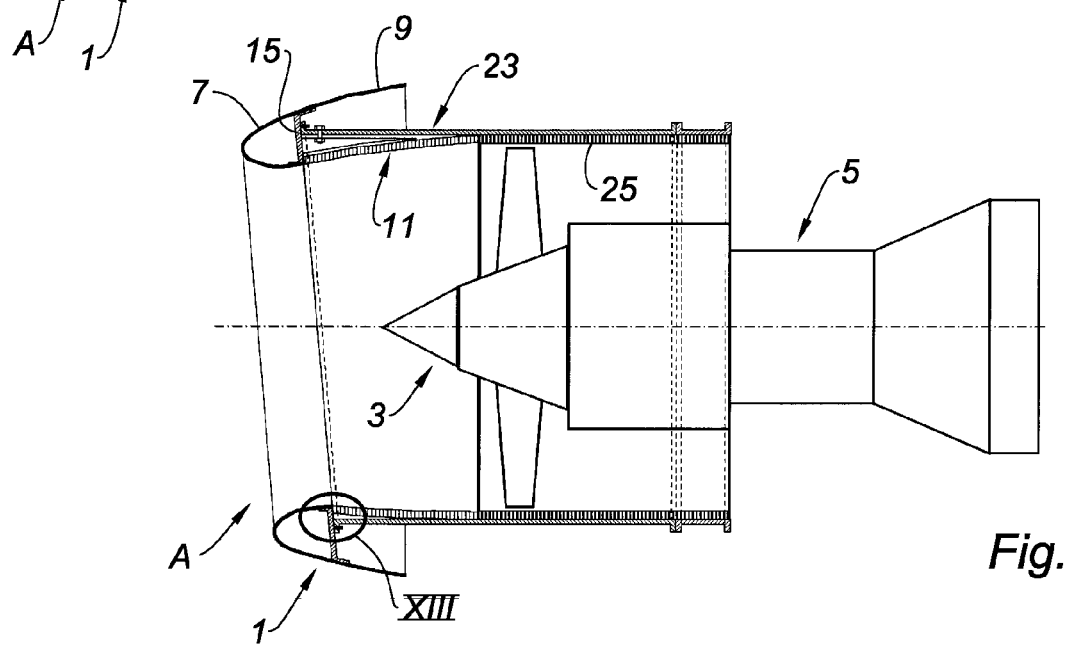
Figure 13:
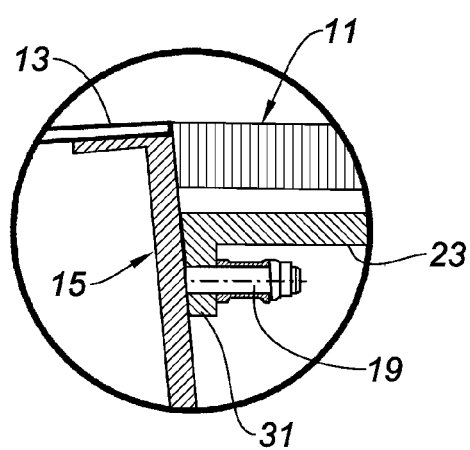

The embodiment illustrated in FIGS. 11 to 13 is different from that illustrated in FIGS. 1 to 3 n that that acoustic shroud 11 is in simple edge to edge contact with the edge 13 of the lip 7, such that in the maintenance position (see FIG. 11), this acoustic shroud 11 remains inside the fan case 23.

The connection by edge to edge contact between the lip 7 and the acoustic shroud 11 is particularly visible in the detail view of FIG. 13.

As in the preceding embodiment, the acoustic shroud 11 is positioned inside the case 23 by simple nesting, and no particular connecting means is necessary between this shroud and the coating 25.

It is possible to place, inside the case 23, elements 53 for centering the shroud 11 in relation to said case.

These elements can assume the form of a lug, and be fixed by suitable means 55 on the wall of the case 23.

Aside from making it possible to correctly center the acoustic shroud 11 in relation to the case 23, they make it possible to correctly orient said shroud in rotation in relation to the case, as well as to prevent this shroud from falling from the case during opening of the air intake structure 1.

Figure 14:
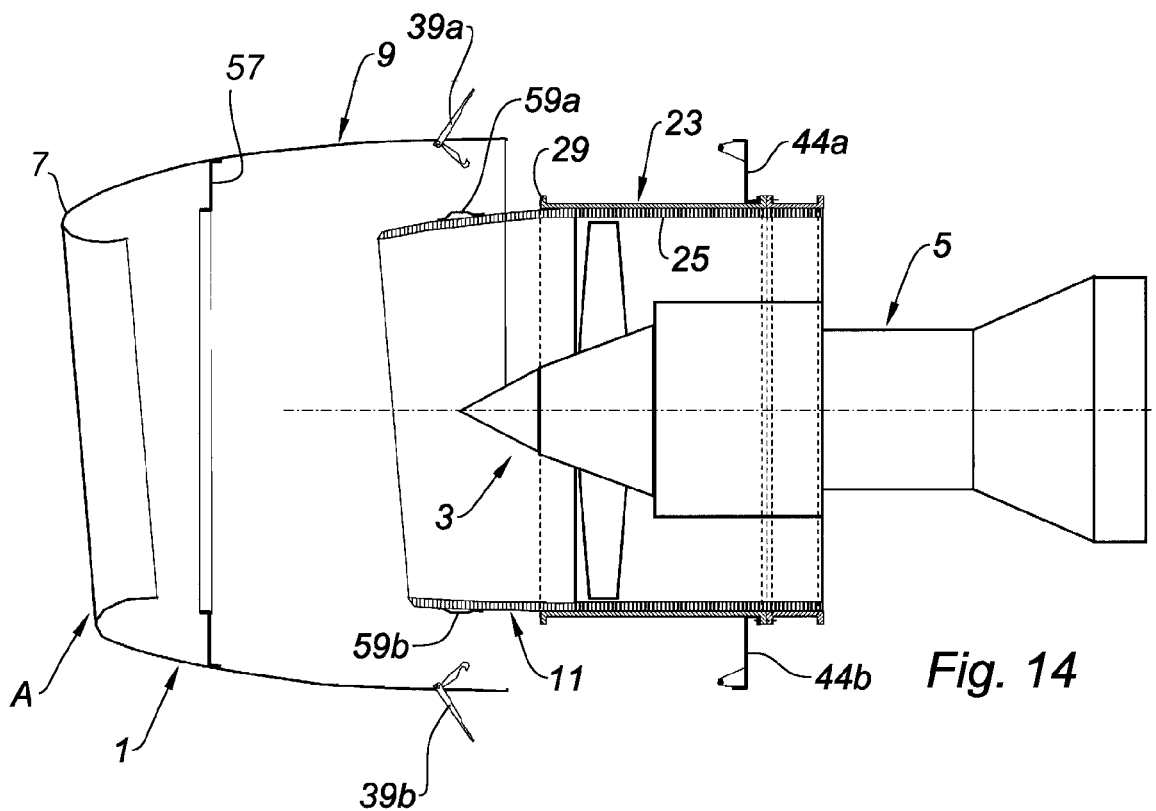
FIGS. 14 and 15 are views similar to FIGS. 4 and 5, respectively, of an alternative of this second embodiment.
Figure 15:
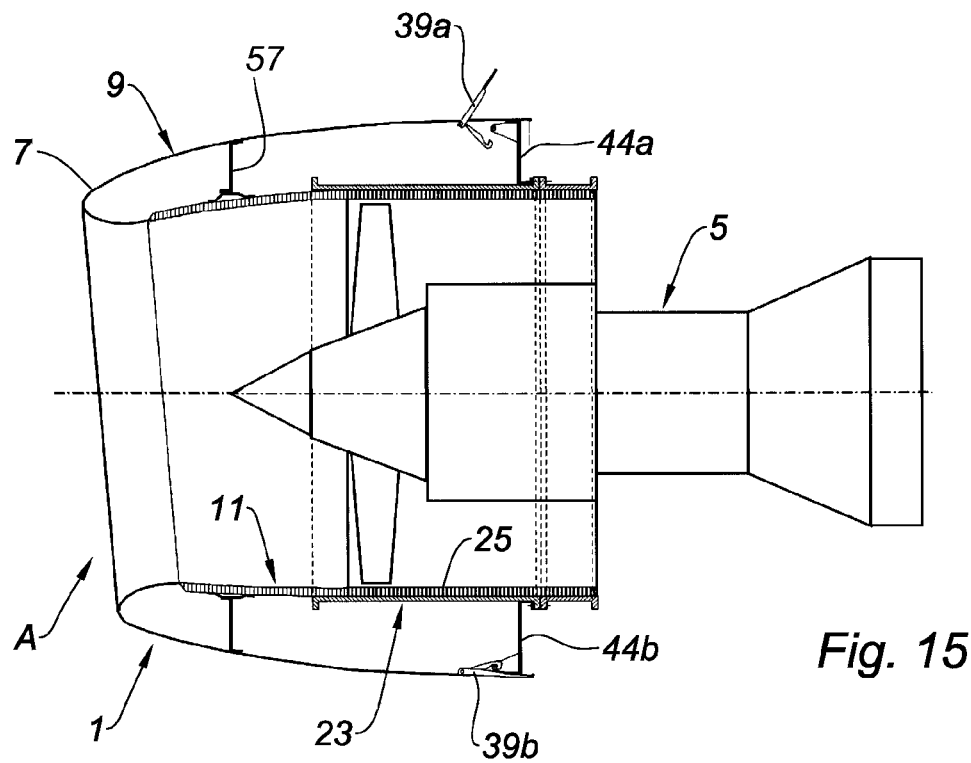

The alternative of FIGS. 14 and 15 is similar to that of the first embodiment, shown in FIGS. 4 and 5: we therefore find the bolts 39a, 39b as well as the corresponding retaining members 41a, 41b.

Unlike the first embodiment, the acoustic shroud 11 is in simple edge to edge contact with the lip 13, such that when the air intake structure 1 is opened, this acoustic shroud remains inside the case 23, as was the case in the alternative of FIGS. 11 to 13.

However, as in the present case the acoustic shroud extends beyond the edge 29 of the case 23, periodic means for connecting this acoustic shroud to the case and/or to the coating 25 can be provided.

This periodic connecting means can for example are composed of screws regularly spaced inside the acoustic shroud 11.

It should be noted that this in no case involves continuous connecting means such as the flanges for fastening the acoustic shroud to the fan case that can be found in the prior art, and in particular in application WO2005/090156.

In that prior art, the flange makes it possible to ensure the maintenance of the acoustic shroud in contact with the fan case, whereas in the present case, this maintenance is ensured by nesting of the shroud inside the fan case, the periodic connecting means serving only to prevent the shroud from falling when the air intake structure 1 is opened.

Because in this embodiment the air intake structure 1 moves in relation to the acoustic shroud 11, which remains nested inside the case 23, it is no longer possible to consider stiffeners 43 that fixedly connect the air intake structure to the shroud, as was the case in the first embodiment (FIGS. 4 to 9).

However, to keep the possibility of stiffening the air intake structure 1, as well as to facilitate its centering in relation to the fan, it is possible to fix, inside the outer panel 9, an annular stiffening member 57, bearing on plates 59a, 59b fixed to the outer periphery of the acoustic shroud 11.

Figure 16:
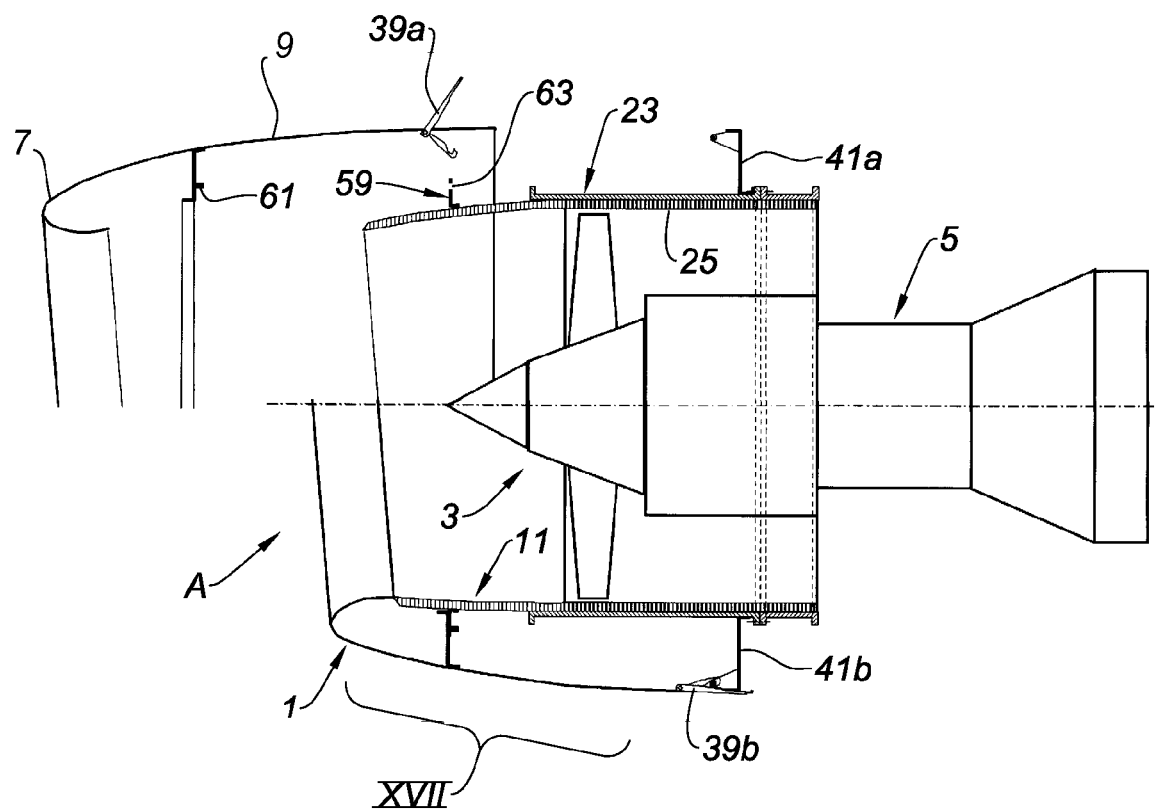
FIG. 16 groups together two half-views of another alternative of this second embodiment, in the maintenance position (upper half-view) and operating position (lower half-view)
Figure 17:
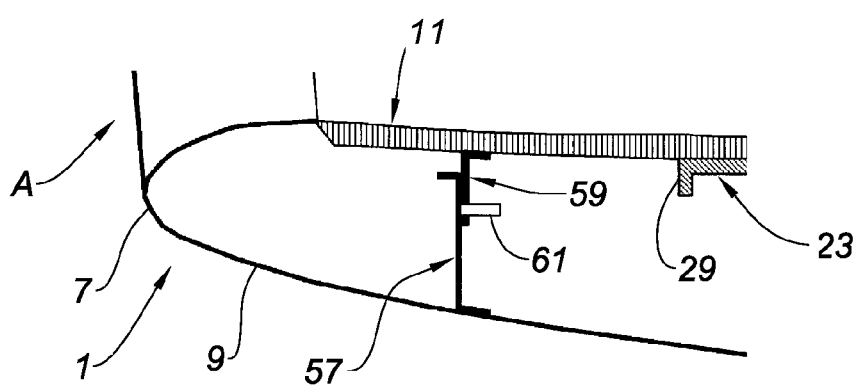
FIG. 17 illustrates a detail of zone XVII of FIG. 16.

Alternatively, as shown in FIGS. 16 and 17, it can be provided that the annular stiffening member 57 includes centering pins 61 cooperating with complementary orifices 63 formed in the plates 59, the latter parts then being able to be angle-shaped, as shown in particular in FIG. 17.

Figure 18:
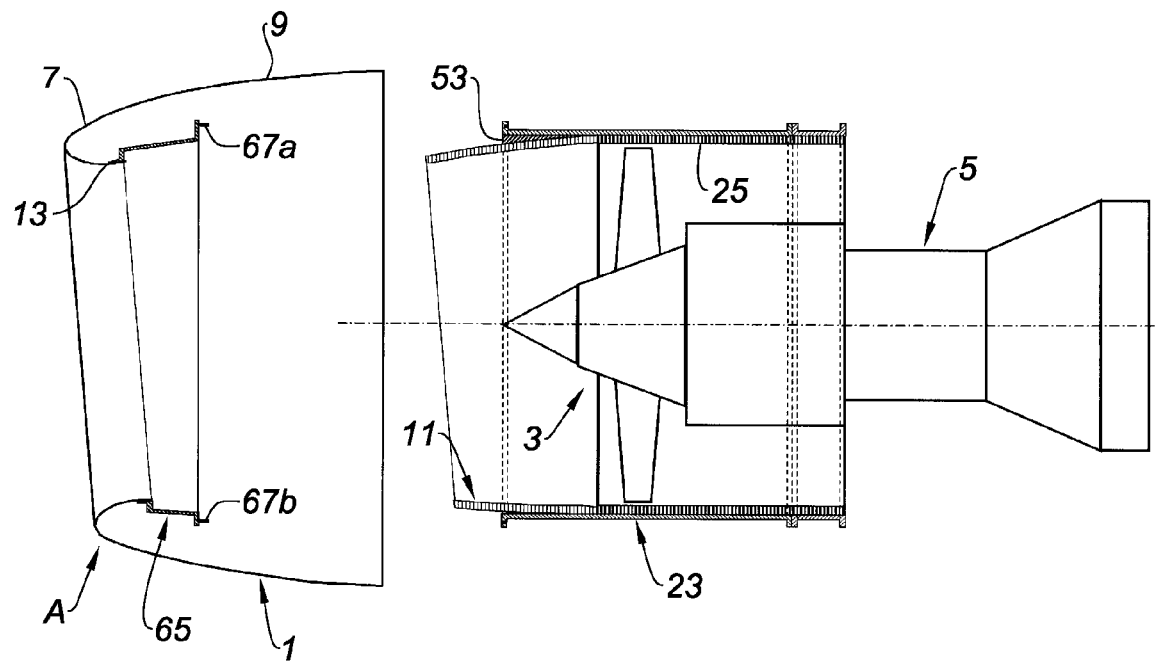
FIGS. 18 and 19 are views similar to FIGS. 11 and 12 of another alternative of the propulsion unit according to the invention.
Figure 19:
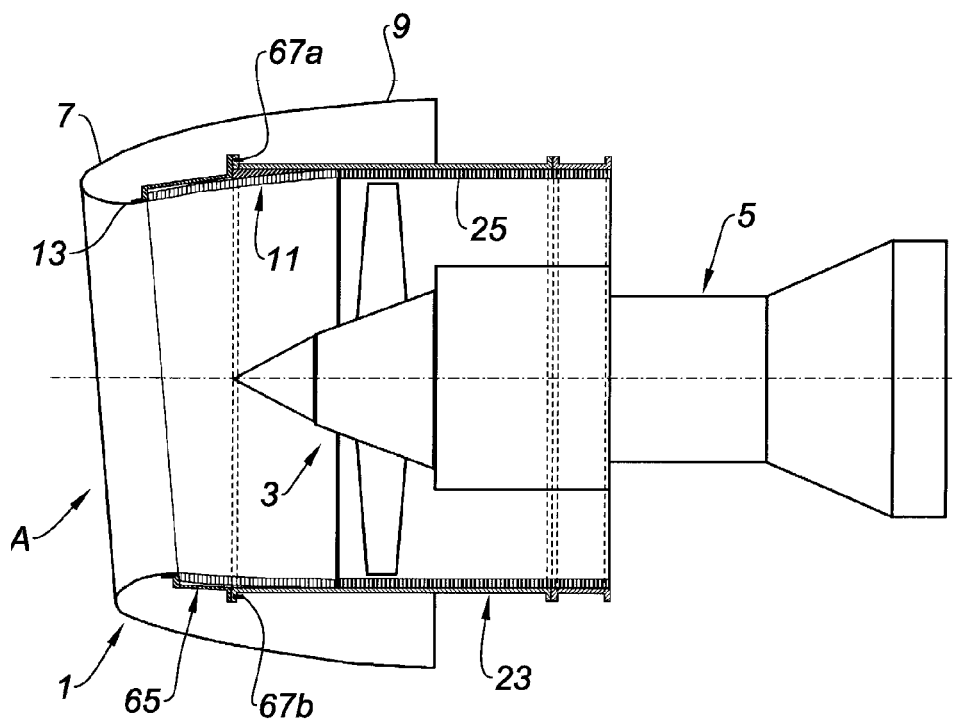

In the alternative shown in FIGS. 18 and 19, the fan case 23 has a length slightly greater than that of the alternatives of FIGS. 14 to 17, without, however, completely covering the acoustic shroud 11 as in the alternatives of FIGS. 11 to 13.

In this particular case, means can be considered for fastening the air intake structure 1 on the edge 29 of the fan case 23 comprising a substantially tubular piece 65 whereof the upstream portion is fixed on the inner edge of the lip 7, and the downstream portion of which includes pins capable of cooperating with corresponding orifices formed in the edge 29 of the case 23.

These pins 67a, 67b allow on one hand the centering of the air intake structure 1 in relation to the fan case 23, and on the other hand the fastening of that air intake structure on said case.

Figure 20:
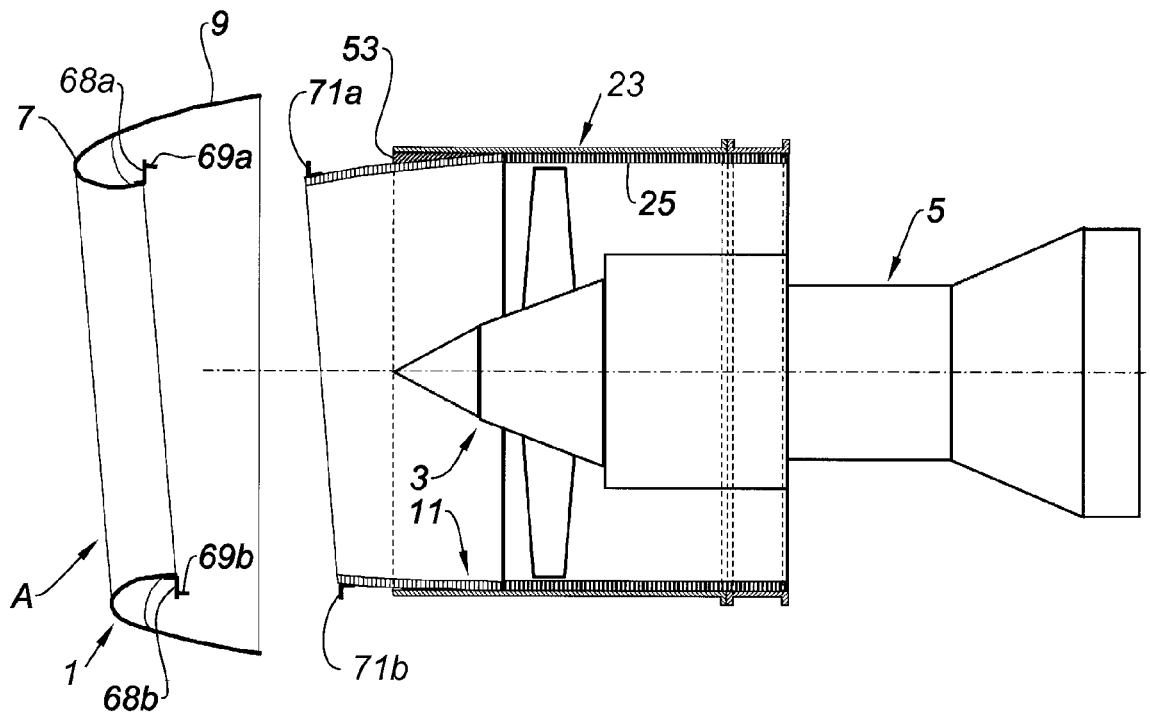
FIGS. 20 and 21 are views similar to FIGS. 11 and 12 of still another alternative of the second embodiment of the propulsion unit according to the invention.
Figure 21:
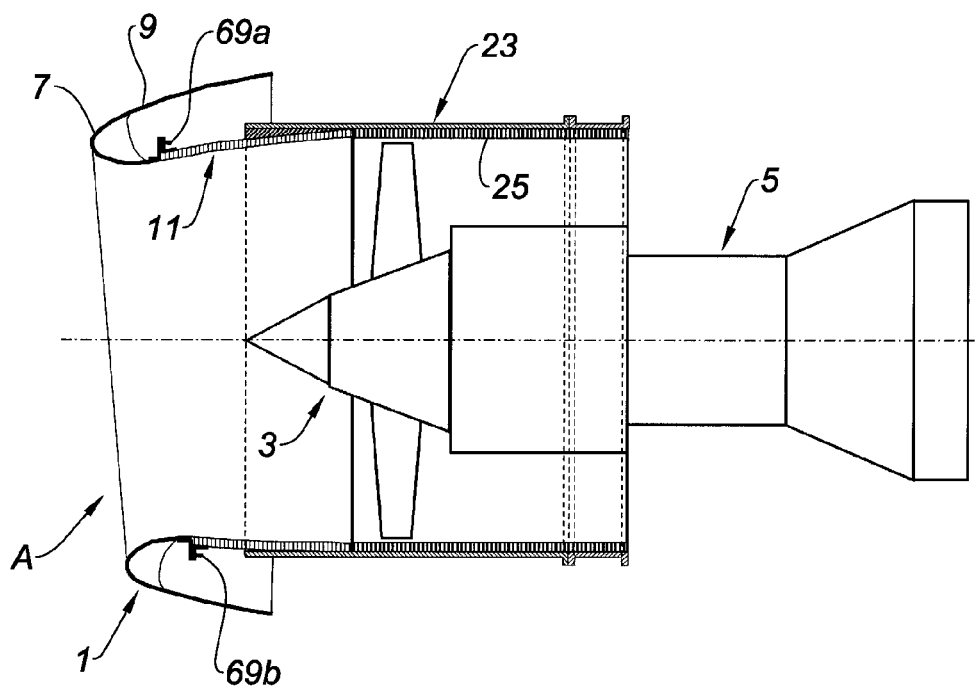

In the alternative illustrated in FIGS. 20 and 21, where the fan case has a length comparable to that of the alternative of FIGS. 18 and 19, the centering and fastening of the air intake structure 1 in relation to the fan case is done via angles bars 68a, 68b, fixed on the inner edge 13 of the lip 7, these angle bars being provided with centering and fastening pins 69a, 69b, capable of cooperating with angle bars provided with complementary orifices 71a, 71b, fastened to the periphery of the acoustic shroud 11, in the vicinity of the upstream edge of this shroud.

This alternative assumes that the acoustic shroud 11 has a stiffness slightly greater than that of the preceding alternatives, so as to be able to bear the stresses transmitted by the air intake structure 1.

The advantages of the propulsion unit according to the invention result directly from the preceding description.

In both the first embodiment (acoustic shroud 11 integral with the air intake structure 1, FIGS. 1 to 10) and the second embodiment (acoustic shroud not connected to the air intakes structure, FIGS. 11 to 21), the acoustic shroud 11 cooperates with the fan case 23 by simple nesting inside the latter, possibly completed by periodic connecting means such as screws discretely distributed on the periphery of the acoustic shroud or deformable support beams as taught by patent application FR08/00471, filed by the applicant on Jan. 29, 2008.

Due to this connection by nesting, it is no longer necessary to provide a flange for fastening the acoustic shroud on the fan case, as was the case in the prior art.

Such a flange required sufficiently significant dimensioning of the acoustic shroud to have the necessary resistance with regard to the stresses passing through the zones connecting the shroud with the flange.

Unlike this prior art, the acoustic shroud of the propulsion unit according to the invention is less stressed and can therefore have smaller dimensions, which makes it possible to save weight.

It will also be noted that the connection of the acoustic shroud 11 by simple nesting in the fan case 23 makes it possible to separate these two pieces from each other very simply, both in the first embodiment (acoustic shroud moving with the air intake structure during opening thereof) and in the second embodiment (acoustic shroud remaining inside the fan case during opening of the air intake structure).

This easy separation considerably facilitates maintenance operations, in particular when it involves replacing the acoustic shroud following the impact of foreign bodies discharged in particular by the fan blades.

The present invention therefore offers a very clear improvement in particular in relation to the arrangements provided in patent FR2903734 and U.S. Pat. No. 4,732,532, in which the acoustic shroud is in fact integrated into an acoustic unit extending over the entire length of the air intake and the fan case.

It will also be noted that in most of the alternatives described above, the transition of the stresses between the air intake structure and the fan case is done directly between those two pieces, by stiffeners and/or locking means, without the acoustic shroud being stressed: this makes it possible to lighten the dimensioning of the shroud considerably.

Of course, the present invention is in no way limited to the embodiments and alternatives described and illustrated, provided as simple examples.

The invention claimed is:

1. A propulsion unit for an aircraft, comprising:
   a fan comprising a fan case having an inner wall that includes a coating, the coating defining an upstream edge set back in relation to an upstream edge of said case; and
   an air intake unit comprising an air intake structure, the air intake structure comprising an air intake lip, a front partition and an acoustic shroud extending between said air intake lip and the upstream edge of said coating,
   wherein said acoustic shroud is connected to said case by nesting inside the case and comes edge to edge with the upstream edge of said coating, completed by periodic connecting means between the shroud and the case, and the fan case extends forward and is fixed to the front partition which is fixed to an inner edge of the air intake lip.

2. The propulsion unit according to claim 1, wherein said acoustic shroud is fastened on said lip, so as to slide as a single piece with said air intake structure when said structure is opened for maintenance.

3. The propulsion unit according to claim 1, wherein said acoustic shroud is in simple edge-to-edge contact on said lip, without being fastened on said lip, so as to remain nested inside said case during opening of said air intake structure for maintenance.

4. The propulsion unit according to claim 1, further comprising means for fastening said air intake structure in relation to said fan.

5. The propulsion unit according to claim 4, wherein said means for fastening is inserted between a front portion of said air intake structure and said case.

6. The propulsion unit according to claim 4, wherein said fastening means comprises bolts inserted between an outer panel of said air intake structure and said case.

7. The propulsion unit according to claim 4, further comprising means for centering said air intake structure in relation to said fan.

8. The propulsion unit according to claim 7, wherein said means for centering is connected to said means for fastening.

9. The propulsion unit according to claim 7, wherein said means for centering the acoustic shroud comprises centering lugs inserted between upstream edges of the shroud and said case.

10. The propulsion unit according to claim 1, further comprising means for stiffening said air intake structure.

11. The propulsion unit according to claim 1, further comprising means for centering said acoustic shroud in relation to said fan case.

12. The propulsion unit according to claim 1, wherein said coating is at least one of at least partially smooth, acoustic and abradable.

13. An aircraft comprising a propulsion unit according to claim 1.

* * * * *